United States Patent
Wolfe et al.

[11] Patent Number: 5,961,125
[45] Date of Patent: Oct. 5, 1999

[54] BRUSH SEAL FOR USE ON ROUGH ROTATING SURFACES

[75] Inventors: Christopher Edward Wolfe; Bharat Sampathkumar Bagepalli, both of Niskayuna; Norman Arnold Turnquist, Cobleskill; Robert Harold Cromer, Fulton; Minyoung Lee, Niskayuna, all of N.Y.

[73] Assignee: General Electric Company, Schenectady, N.Y.

[21] Appl. No.: 08/942,887

[22] Filed: Oct. 2, 1997

[51] Int. Cl.$^6$ .............................. F01D 11/02; F16J 15/44
[52] U.S. Cl. ............................................................. 277/355
[58] Field of Search .......................... 277/355; 415/170.1

[56] References Cited

U.S. PATENT DOCUMENTS

| | | |
|---|---|---|
| 5,108,116 | 4/1992 | Johnson et al. . |
| 5,201,530 | 4/1993 | Kelch et al. . |
| 5,335,920 | 8/1994 | Tseng et al. ............................ 277/355 |
| 5,474,306 | 12/1995 | Bagepalli et al. .................... 415/174.2 |
| 5,613,829 | 3/1997 | Wolfe et al. .......................... 415/174.1 |

FOREIGN PATENT DOCUMENTS

WO 93/03299  2/1993  WIPO ..................................... 277/355

OTHER PUBLICATIONS

Hendriks et al., "Integrity Testing of Brush Seal in Shroud Ring of T–700 Engine", presented at the International Gas Turbine and Aeroengine Congress and Exposition, May 24–27, 1993, Cincinnati, Ohio.

*Primary Examiner*—Anthony Knight
*Assistant Examiner*—Gary Grafel
*Attorney, Agent, or Firm*—Douglas E. Erickson; Marvin Snyder

[57] ABSTRACT

A brush seal which, among other applications, may be used for sealing a steam leakage gap between the shrouded free end of steam-turbine buckets (blades) of a steam-turbine rotor and a circumferentially surrounding steam-turbine stator. In a first embodiment, the brush seal includes first and second bristle packets having, respectively, first and second bristles, wherein the second bristles are more abrasive than the first bristles. In a second embodiment, the brush seal includes a bristle packet having bristles which are more abrasive proximate their free ends than not proximate their free ends.

11 Claims, 2 Drawing Sheets

BRUSH SEAL FOR USE ON ROUGH ROTATING SURFACES

FIELD OF THE INVENTION

The present invention relates generally to brush seals, and more particularly to a brush seal for use on rough rotating surfaces.

BACKGROUND OF THE INVENTION

Brush seals are used to minimize leakage through a gap between two components, wherein such leakage is from a higher pressure area to a lower pressure area. Such leakage is greater when the tips of the bristles of the brush seal contact a rough rotating surface of one of the components than when they contact a smooth rotating surface of the one component. A soft brush seal will not smooth out the rough surfaces of the one component and may itself be worn by such rough surfaces, either or both of which results in unacceptable seal leakage. An abrasive brush seal will smooth out the rough surfaces of the one component. However, Applicants have found that the abrasive bristles will not seal well if they do not wear evenly, which typically is the case.

Brush seals have been used, or their use proposed, in rotating machinery. Such use includes, but is not limited to, turbomachinery including steam turbines and gas turbines used for power generation and gas turbines used for aircraft and marine propulsion. It is noted that brush seals minimize the leakage of steam in steam turbines and minimize the leakage of compressed air or combustion gases in gas turbines.

A steam turbine has a steam path which typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Gas or steam leakage, either out of the gas or steam path or into the gas or steam path, from an area of higher pressure to an area of lower pressure, is generally undesirable. For example, gas-path leakage in the turbine or compressor area of a gas turbine, between the rotating tips of the turbine or compressor rotor blades and the circumferentially surrounding turbine or compressor casing, will lower the efficiency of the gas turbine leading to increased fuel costs. Also, steam-path leakage in the turbine area of a steam turbine, between the rotating tips of the buckets (i.e., blades) and the circumferentially surrounding casing, will lower the efficiency of the steam turbine leading to increased fuel costs.

Conventional brush seal designs have been proposed for use in such applications. The brush seals have wire or ceramic bristles conventionally welded or otherwise affixed to a backing plate. To improve performance, such brush seals typically align their wire bristles to contact the rotating tips of the blades/buckets at an angle between generally forty-five and generally sixty degrees with respect to a radius line from the center of the rotor to the point of bristle contact. However, the rotating tips of the blades/buckets typically present a rough surface which has sealing problems as previously discussed.

What is needed is an improved brush seal which will maintain its sealing qualities even when used against rough rotating surfaces such as the shrouded free ends of gas turbine blades or steam turbine buckets.

SUMMARY OF THE INVENTION

In a first preferred embodiment, the brush seal of the invention includes a brush-seal backing plate and first and second bristle packets. The backing plate has opposing first and second edges. The first bristle packet contacts the backing plate, has a secured end attached to the backing plate, has a free end overhanging the second edge, and contains generally identical first bristles. The second bristle packet is located adjacent the first bristle packet, contacts the backing plate, has a secured end attached to the backing plate, has a free end overhanging the second edge, and contains generally identical second bristles. The second bristles are more abrasive than the first bristles.

Preferably, the first preferred brush seal is for generally sealing a leakage gap between a rotor and a circumferentially-surrounding stator. The backing plate is attached to the stator. The free end of the first bristle packet extends towards and at least proximate the rotor (and preferably the shrouded free end of the blades of the rotor). The free end of the second bristle packet extends towards and makes interference contact with the rotor (and preferably the shrouded free end of the blades of the rotor).

In a second preferred embodiment, the brush seal of the invention includes a brush-seal backing plate and a bristle packet. The backing plate has opposing first and second edges. The bristle packet contacts the backing plate and has generally identical bristles. The bristles each have a secured end attached to the backing plate and a free end overhanging the second edge. The bristles proximate the free end are more abrasive than the same bristles other than proximate the free end.

Preferably, the second preferred brush seal is for generally sealing a leakage gap between a rotor and a circumferentially-surrounding stator. The backing plate is attached to the stator. The free end of the bristle packet extends towards and makes interference contact with the rotor (and preferably the shrouded free end of the blades of the rotor).

Several benefits and advantages are derived from the invention. In the first preferred brush seal, the initially rough surface of the shrouded free end of the rotor blades will be worn smooth by the expendable and more abrasive bristles of the second bristle packet while the less abrasive bristles of the first bristle packet will conform to the shape of the now smooth surface to achieve good sealing, as can be appreciated by those skilled in the art. In the second preferred brush seal, the initially rough surface of the shrouded free end of the rotor blades will be worn smooth by the expendable and more abrasive free end of the bristles while the other portions of the bristles will conform to the shape of the now smooth surface to achieve good sealing, as can be understood by the artisan. Engineering analysis indicates the brush seal of the invention can result in a two-to-one reduction in gas or steam leakage which, in gas or steam turbines used for power generation, could result in savings of tens of thousands of dollars per year per turbine.

DETAILED DESCRIPTION OF THE INVENTION

Figure 1:
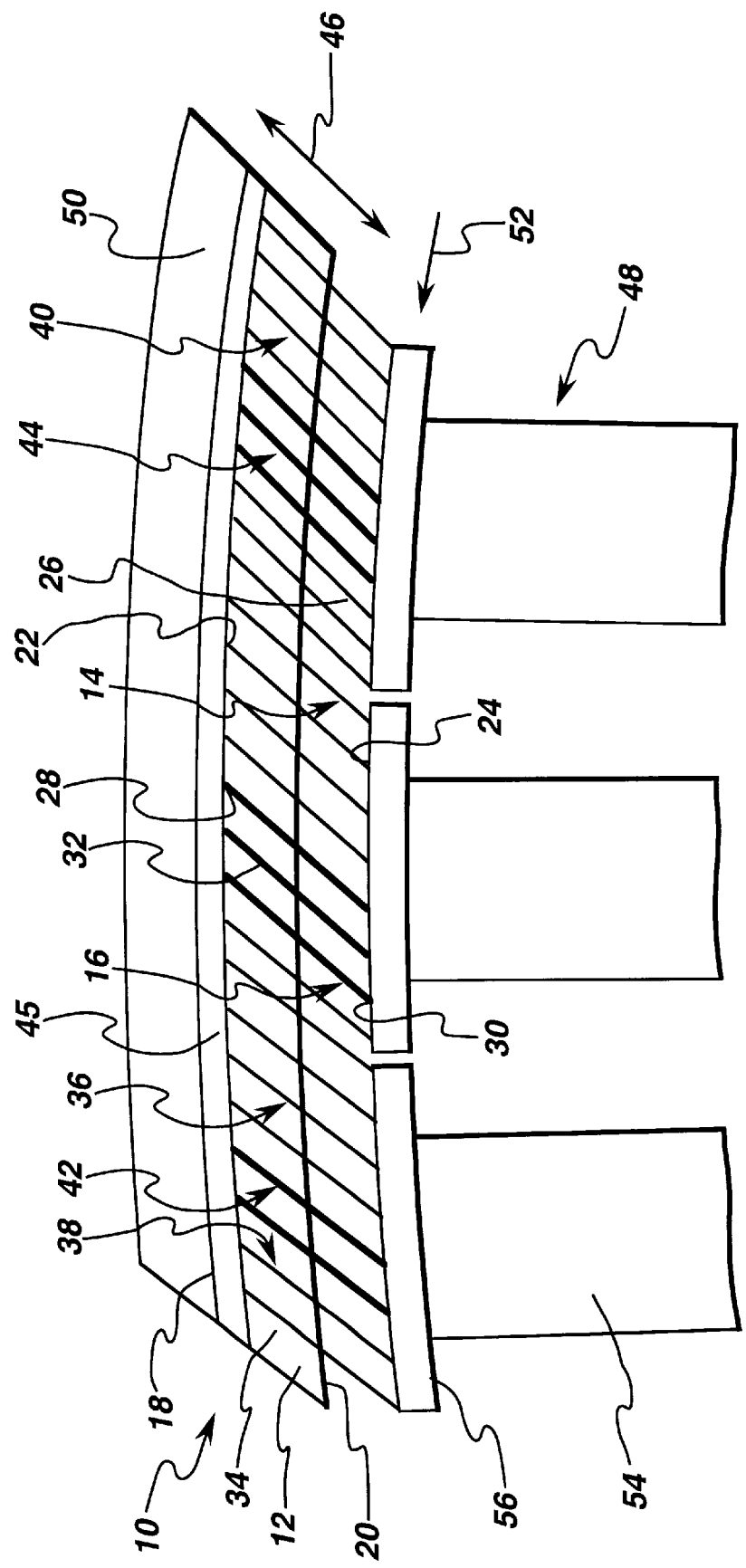
FIG. 1 is a schematic front elevational view of a section of a first preferred embodiment of the brush seal of the present invention showing four first bristle packets and three second bristle packets together with a typical brush seal installation.

Referring now to the drawings, FIG. 1 schematically shows a first preferred embodiment of the brush seal 10 of the present invention. The brush seal 10 includes a brush-seal backing plate 12, a first bristle packet 14, and a second bristle packet 16. The backing plate 12 has opposing first and second edges 18 and 20. The first bristle packet 14 contacts the backing plate 12, has a secured end 22 attached to the backing plate 12, and has a free end 24 overhanging the second edge 20. The first bristle packet 14 contains a plurality of generally identical first bristles 26. The second bristle packet 16 is disposed adjacent the first bristle packet 14. The second bristle packet 16 contacts the backing plate 12, has a secured end 28 attached to the backing plate 12, and has a free end 30 overhanging the second edge 20. The second bristle packet 16 contains a plurality of generally identical second bristles 32 (which are shown in FIG. 1 as thicker lines than the lines showing the first bristles 26).

The second bristles 32 of the second bristle packet 16 are more abrasive than the first bristles 26 of the first bristle packet 14. Other parameters being equal, a thicker bristle is more abrasive than a thinner bristle because the thicker bristle will be stiffer and hence apply a greater load to a surface. Other parameters being equal, a bristle having a larger coefficient of hardness is more abrasive than a bristle having a smaller coefficient of hardness. One bristle may be harder because it has a different composition. Another bristle may be harder because it underwent a hardening heat treatment. The proceeding examples are not a complete list, and the manner (e.g., bristle chemistry) of obtaining the second bristles 32 such that they are more abrasive than the first bristles 26 is left to the artisan.

The backing plate 12 can have any shape including, without limitation, a straight or curved shape. Preferably, the backing plate 12 is a segment 34 of an annular ring. In a desired arrangement, the brush seal 10 further includes additional first bristle packets 36, 38, and 40 which are generally identical to the first bristle packet 14, and the brush seal 10 also includes additional second bristle packets 42 and 44 (shown in FIG. 1 as thicker lines than the lines showing the additional first bristle packets 36, 38, and 40) which are generally identical to the second bristle packet 16, wherein the second and additional second bristle packets 16, 42, and 44 are generally equally circumferentially spaced apart.

It is preferred that the secured end 22 of the first bristle packet 14 is attached to the backing plate 12 proximate the first edge 18 of the backing plate 12, and that the secured end 28 of the second bristle packet 16 is attached to the backing plate 12 proximate the first edge 18 of the backing plate 12. Desirably, the second bristle packet 16 generally abuts the first bristle packet 14. It is understood that, in describing the present brush seal invention, when a first part is described as being attached to a second part, such first part may be directly or indirectly attached to such second part. It is noted that brush seal bristles include, without limitation, metal wire bristles and ceramic wire bristles. For most metal wire bristles, the attachment of the secured end 22 of the first bristle packet 14 and the secured end 28 of the second bristle packet 16 to the backing plate 12 is accomplished by a weldment 45. A brush seal typically also has a front plate (omitted from FIG. 1 for clarity) which covers the weldment.

In a first exemplary construction, the first bristles 26 each have a generally identical first length and a generally identical and generally constant first diameter along the first length. Likewise, the second bristles 32 each have a generally identical second length and a generally identical and generally constant second diameter along the second length. The second diameter is greater than the first diameter, and the second length is greater than the first length.

In a second exemplary construction, the first bristles 26 each have a generally identical first length and a generally identical first coefficient of hardness. Likewise, the second bristles 32 each have a generally identical second length and a generally identical second coefficient of hardness. The second coefficient of hardness is greater than the first coefficient of hardness, and the second length is greater than the first length.

In a preferred application, as shown in the brush seal installation of FIG. 1, the brush seal 10 of the invention is for generally sealing a leakage gap 46 between a rotor 48 and a circumferentially-surrounding stator 50, wherein the rotor 48 undergoes rotation. Only a portion of the stator 50 and the rotor 48 are shown in FIG. 1. The term "rotation", for the purpose of describing the present invention, means any relative rotation of the two components and includes continuous rotation as well as large relative oscillations. Preferably, the leakage gap is a steam-leakage gap or a gas-leakage gap wherein the word "gas" includes compressed air or combustion gas.

The backing plate 12 is disposed in the gap 46, is attached to the stator 50, and is spaced-apart from the rotor 48. The direction of rotation of the rotor 48 is indicated by arrow 52. The free end 24 of the first bristle packet 14 extends towards and at least proximate the rotor 48, and the free end 30 of the second bristle packet 16 extends towards and makes interference contact with the rotor 48.

In a preferred construction, the rotor 48 has a circumferential row of generally identical blades 54 each having a shrouded free end 56. The second bristles 32 typically are more abrasive than the shrouded free end 56 of the blades 54, and the shrouded free end 56 of the blades 54 typically is more abrasive than the first bristles 26. The free end 30 of the second bristle packet 16 makes interference contact with the shrouded free end 56 of the blades 54 of the rotor 48. Preferably, the free end 24 of the first bristle packet 14 contacts the shrouded free end 56 of the blades 54 of the rotor 48. In a favored installation, the stator 50 is a turbine casing and preferably a steam turbine casing, the rotor 48 is a turbine rotor and preferably a steam turbine rotor, the leakage gap 46 is a steam-leakage gap, and the blades 54 are steam-turbine buckets. The second bristles 32 will wear the shrouded free end 58 of the blades 54 of the rotor 48 at an accelerated rate while typically wearing themselves to the same length as the first bristles 26. The brush seal 10 has a greater number of first bristles 26 than second bristles 32. Preferably, the number of second bristles 32 is less than, or generally equal to, ten percent of the total number of first and second bristles 26 and 32.

Figure 2:
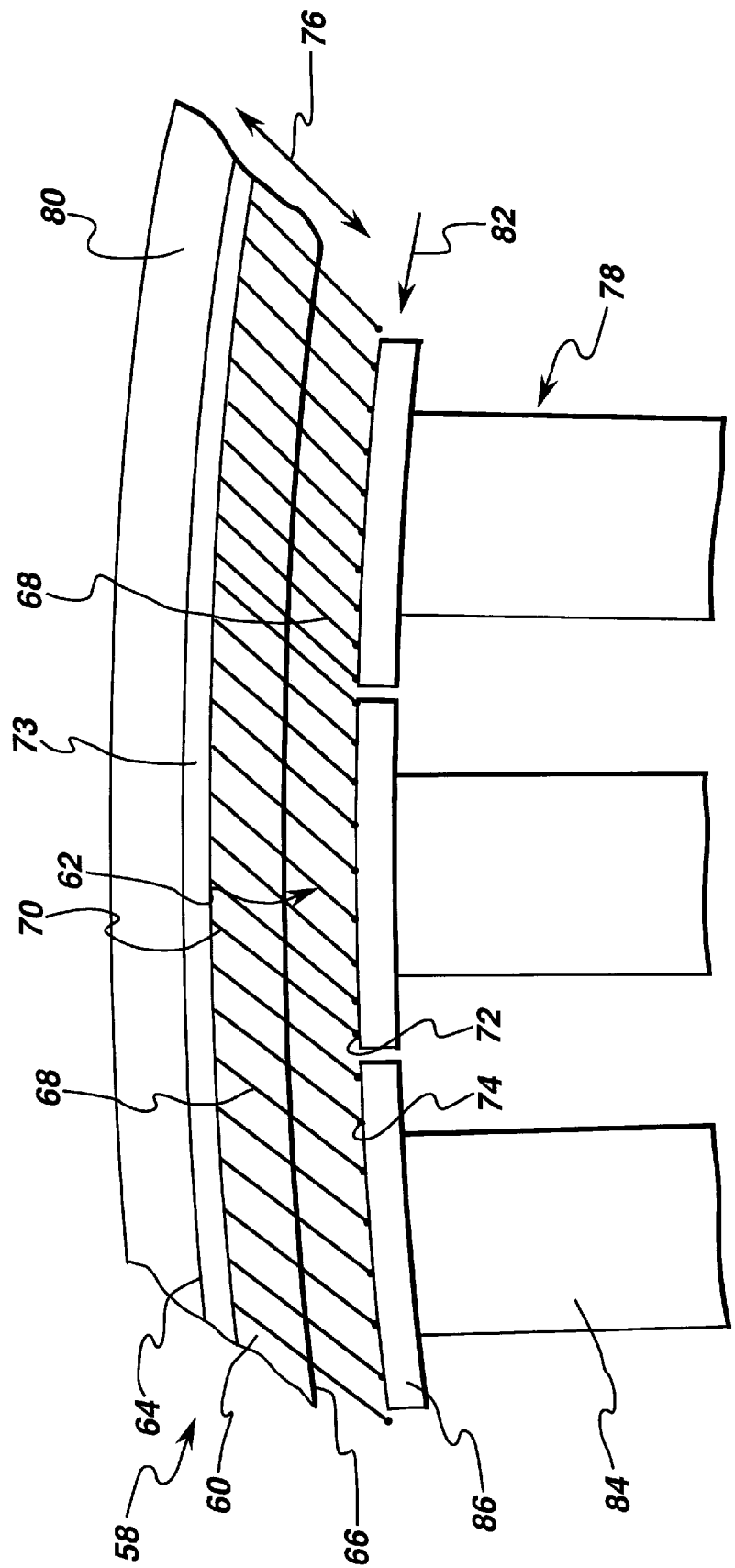
FIG. 2 is a view, as in FIG. 1, but of a second preferred embodiment of the brush seal of the present invention showing a bristle packet containing bristles having more abrasive free ends.

Referring again to the drawings, FIG. 2 schematically shows a second preferred embodiment of the brush seal 58 of the present invention. The brush seal 58 includes a brush-seal backing plate 60 and a bristle packet 62. The backing plate 60 has opposing first and second edges 64 and 66. The bristle packet 62 contacts the backing plate 60 and has a plurality of generally identical bristles 68. The bristles 68 each have a secured end 70 attached to the backing plate 60 and a free end 72 overhanging the second edge 66. The bristles 68 proximate the free end 72 are more abrasive than the same bristles 68 other than proximate the free end 72.

Preferably, the secured end 70 of the bristle packet 62 is attached (such as by a weldment 73) to the backing plate 60 proximate the first edge 64. In an exemplary embodiment, the bristles 68 each have a generally identical first coefficient of hardness other than proximate the free end 72 and have a generally identical second coefficient of hardness proximate the free end 72. The second coefficient of hardness is greater than the first coefficient of hardness. In a preferred construction, the brush seal 58 also includes a coating 74 (shown as a dot in FIG. 2), the bristles 68 proximate the free end 72 are generally covered with the coating 74, and the same bristles 68 other than proximate the free end 72 are devoid of the coating 74. The coating 74 is more abrasive than the bristles 68. Preferably, the coating 74 comprises (and desirably consists essentially of) alumina.

In a preferred application, as shown in the bush seal installation of FIG. 2, the brush seal 58 of the invention is for generally sealing a leakage gap 76 between a rotor 78 and a circumferentially-surrounding stator 80, wherein the rotor 78 undergoes rotation. Only a portion of the stator 80 and the rotor 78 are shown in FIG. 2. The term "rotation", for the purpose of describing the present invention, means any relative rotation of the two components and includes continuous rotation as well as large relative oscillations. Preferably, the leakage gap is a steam-leakage gap or a gas-leakage gap wherein the word "gas" includes compressed air or combustion gas.

The backing plate 60 is disposed in the gap 76, is attached to the stator 80, and is spaced-apart from the rotor 78. The direction of rotation of the rotor 78 is indicated by arrow 82. The free end 72 of the bristles 68 extends towards and makes interference contact with the rotor 78.

In a preferred construction, the rotor 78 has a circumferential row of generally identical blades 84 each having a shrouded free end 86. The coating 74 typically is more abrasive than the shrouded free end 86 of the blades 84, and the shrouded free end 86 of the blades 84 typically is more abrasive than the bristles 68. In a favored installation, the stator 80 is a turbine casing and preferably a steam turbine casing, the rotor 78 is a turbine rotor and preferably a steam turbine rotor, the leakage gap 76 is a steam-leakage gap, and the blades 84 are steam-turbine buckets.

The foregoing description of several preferred embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A brush seal for generally sealing a leakage gap between a rotor and a circumferentially-surrounding stator, said brush seal comprising:
   a) a brush-seal backing plate having opposing first and second edges and attached to said stator;
   b) first bristle packet contacting said backing plate, having a secured end attached to said backing plate, having a free end overhanging said second edge, and containing a plurality of generally identical first bristles, wherein said free end of said first bristle packet extends towards and at least proximate said rotor; and
   c) a second bristle packet disposed adjacent said first bristle packet, contacting said backing plate, having a secured end attached to said backing plate, having a free end overhanging said second edge, and containing a plurality of generally identical second bristles, wherein said free end of said second bristle packet extends towards and makes interference contact with said rotor and wherein said second bristles are more abrasive than said first bristles,
   wherein said rotor has a circumferential row of generally identical blades each having a shrouded free end,
   wherein said second bristles are more abrasive than said shrouded free end of said blades,
   wherein said shrouded free end of said blades is more abrasive than said first bristles,
   wherein said free end of said second bristle packet makes interference contact with said shrouded free end of said blades of said rotor; and
   wherein said free end of said first bristle packet contacts said shrouded free end of said blades of said rotor.

2. The brush seal of claim 1, wherein said stator is a turbine casing and said rotor is a turbine rotor.

3. The brush seal of claim 2, wherein said leakage gap is a steam-leakage gap, wherein said turbine casing is a steam turbine casing, wherein said turbine rotor is a steam turbine rotor, and wherein said blades are steam-turbine buckets.

4. A brush seal comprising:
   a) a brush-seal backing plate having opposing first and second edges; and
   b) a bristle packet contacting said backing plate and having a plurality of generally identical bristles, wherein said bristles each have a secured end attached to said backing plate and a free end overhanging said second edge, and wherein the free-end portions of said bristles are more abrasive than the non-free-end portions of said bristles.

5. The brush seal of claim 4, wherein said secured end of said bristle packet is attached to said backing plate proximate said first edge.

6. The brush seal of claim 5,
   wherein said bristles each have a generally identical first coefficient of hardness other than proximate said free end,
   wherein said bristles each have a generally identical second coefficient of hardness proximate said free end, and
   wherein said second coefficient of hardness is greater than said first coefficient of hardness.

7. The brush seal of claim 5, also including a coating, wherein said bristles proximate said free end are generally covered with said coating, wherein the same bristles other than proximate said free end are devoid of said coating, and wherein said coating is more abrasive than said bristles.

8. The brush seal of claim 4 for generally sealing a leakage gap between a rotor and a circumferentially-surrounding stator,
   wherein said backing plate is attached to said stator, and
   wherein said free end of said bristles extends towards and makes interference contact with said rotor.

9. The brush seal of claim 8,
   wherein said rotor has a circumferential row of generally identical blades each having a shrouded free end,
   wherein said coating is more abrasive than said shrouded free end of said blades, and
   wherein said shrouded free end of said blades is more abrasive than said bristles.

10. The brush seal of claim 9, wherein said stator is a turbine casing and said rotor is a turbine rotor.

11. The brush seal of claim 10, wherein said leakage gap is a steam-leakage gap, wherein said turbine casing is a steam turbine casing, wherein said turbine rotor is a steam turbine rotor, and wherein said blades are steam-turbine buckets.

* * * * *